Dec. 3, 1935. D. S. BARROWS 2,022,999
DRAFT RIGGING
Filed May 13, 1929 3 Sheets-Sheet 1
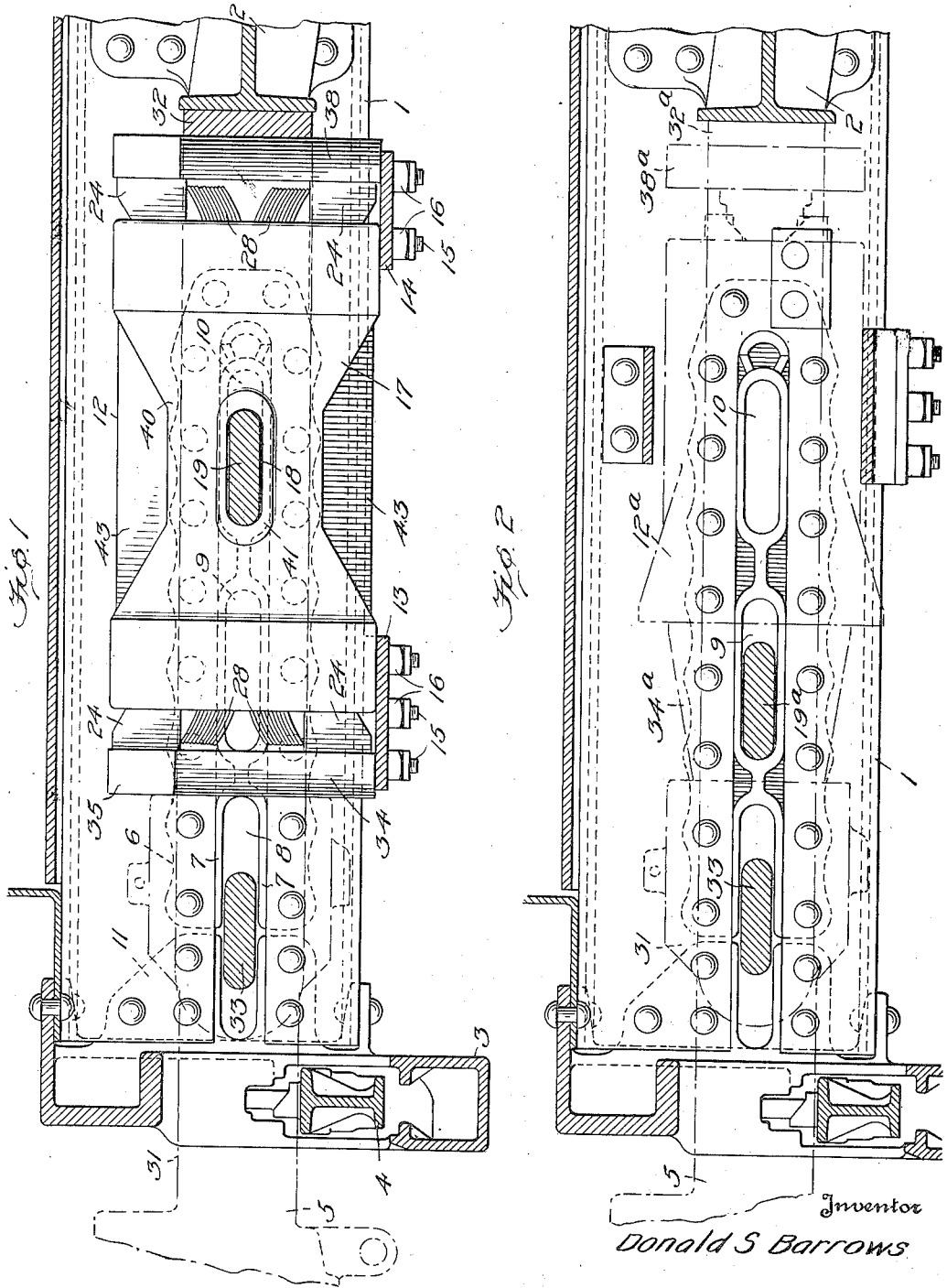
Inventor
Donald S Barrows

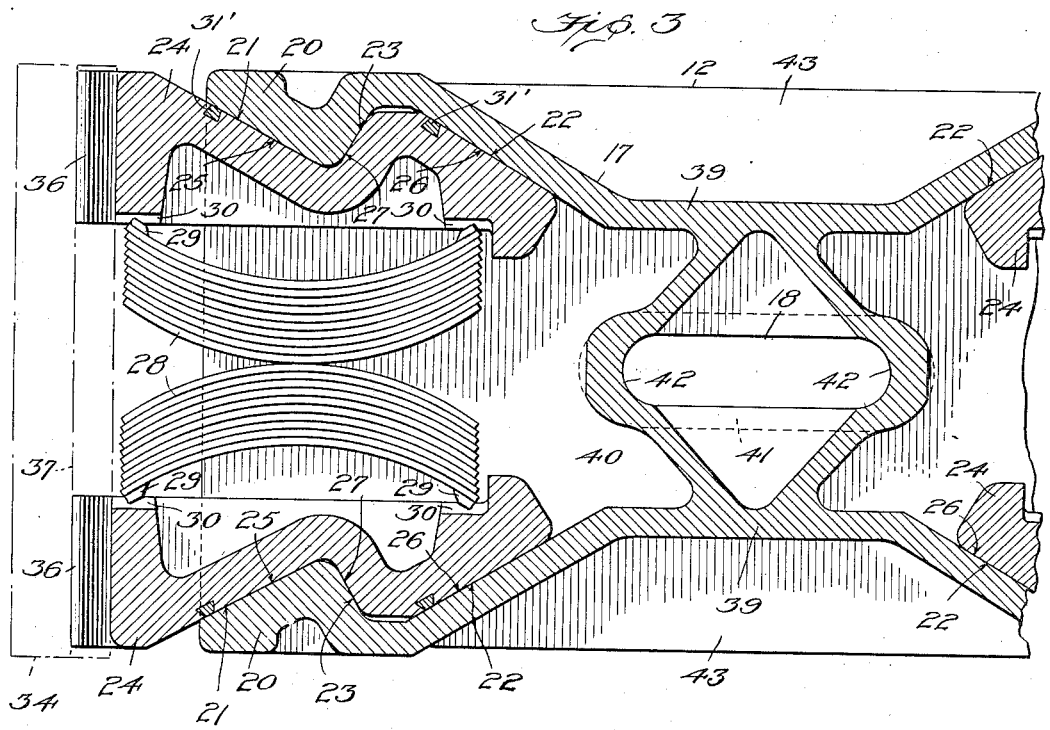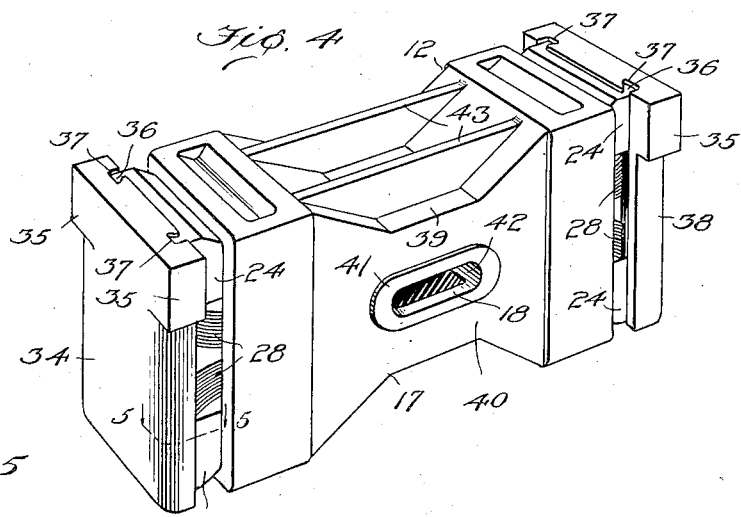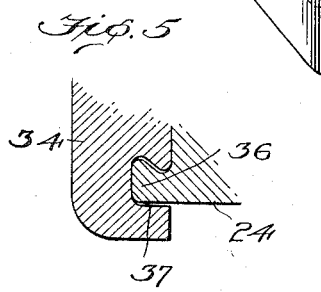

Dec. 3, 1935.  D. S. BARROWS  2,022,999
DRAFT RIGGING
Filed May 13, 1929   3 Sheets-Sheet 3

Inventor
Donald S. Barrows
By
Attorney

Patented Dec. 3, 1935

2,022,999

UNITED STATES PATENT OFFICE 2,022,999

DRAFT RIGGING

Donald S. Barrows, Rochester, N. Y., assignor to The Symington Company, New York, N. Y., a corporation of Maryland Application May 13, 1929, Serial No. 362,832

27 Claims. (Cl. 213—37)

This application is a continuation in part of my application Serial No. 127,133, filed August 4, 1926, now Patent No. 1,884,516 of October 25, 1932.

This invention relates to the arrangement of railway draft rigging and the combination therewith of friction shock absorbing mechanism, the shock-absorbing mechanism and the draft rigging elements being adapted to permit greater travel of the coupler under buffing than under draft, the greater coupler movement under buffing being resisted by a greater shock-absorbing capacity of the friction mechanism than is interposed in movement under draft.

The principal object of my invention, generally stated, is to provide, in combination with a car underframe, a friction draft mechanism comprising spring-actuated friction elements operating in series and preferably acting on a column member, or enclosed in a housing or shell, having a slot therein, or formed with receptacles, for receiving a stop key or bar, the arrangement of said mechanism with said underframe being such that the former will preferably function to provide a greater energy absorbing capacity and movement under buffing than under draft.

Another object of my invention is the provision of cushioning mechanism which may comprise a housing formed with inclined friction surfaces, friction wedges with correspondingly inclined friction surfaces cooperating with said housing friction surfaces, a follower and projections between said follower and wedges to directly hold the same in interlocked relation, or a column member or housing open or formed with inclined friction surfaces at both ends, friction elements at each end, resilient means disposed between said friction elements for urging them into engagement with said housing, said housing being preferably slotted or provided with key receptacles which may be disposed adjacent the center.

A further object of my invention is the provision of cushioning mechanism which may comprise a housing or column member the ends of which preferably flare or are provided with inclined friction surfaces, friction elements in each end and with end portions projecting therefrom, said mechanism preferably involving a follower at each end engaging the projecting ends of said friction elements.

A still further object of my invention is the provision of cushioning mechanism comprising a bell-mouthed housing having spaced inclined friction surfaces, a pair of friction elements, the engaging friction surfaces on said housing and elements being preferably interrupted by shoulders, so that said elements are interlocked with respect to said housing member, said resilient means preferably comprising sets of reversely bowed leaf springs contacting with each other adjacent the center and directly engaging the friction elements adjacent each end.

A further object of my invention is the provision of a housing for cushioning mechanism comprising pairs of side walls, one pair of which is inwardly converging toward a central portion and provided with outstanding flanges filling the space in the angles outwardly of said converging portions, and spaced from one another and inwardly of the planes of the other side walls.

A still further object of my invention is the provision in railway draft rigging, in combination with slotted draft sills, a drawbar or coupler and yoke-acting means, of a friction draft gear comprising a housing open at both ends, friction elements at each end, resilient means, said yoke-acting means embracing said gear for actuating the rear elements on draft, the housing being slotted between the friction elements at the ends, and a key received in the slotted portion and sill slots, with the latter slots elongated rearwardly only, whereby the friction elements at both ends are operated on buff and those at the rear end only are operated on draft.

An additional object of my invention is the provision in railway draft rigging, in combination with a drawbar, cheek plates, each provided with a plurality of longitudinally spaced key slots, of a pair of cushioning devices disposed between said plates with each device comprising main friction means, a set of friction elements, laterally acting resilient means, slotted yoke-acting means, a key extending through the yoke-acting means slots and through the forward slots of the cheek plates to connect the drawbar and yoke-acting means, and another key through other slots in said yoke-acting means, between the cushioning devices and entering the rearward slots of said cheek plates.

Other objects and advantages of the invention relating to the particular arrangement and construction of the various parts will become apparent as the description proceeds.

Referring to the drawings illustrating my invention, the scope whereof is defined by the appended claims.

Figure 1 is a vertical longitudinal sectional view between the sills of a car underframe illustrating one embodiment of my slotted, double ended, series gear and associated draft rigging and cheek plates.

Figure 2 is a similar vertical longitudinal sectional view, the double ended gear, however, being replaced by a conventional form of single ended gear associated with similar rigging and the same cheek plates.

Figure 3 is a fragmentary vertical longitudinal sectional view of the form of double ended series friction draft gear shown in Figure 1.

Figure 4 is a perspective view of the friction draft gear shown in Figures 1 and 3.

Figure 5 is a fragmentary horizontal sectional view on the line 5—5 of Figure 4 looking in the direction of the arrows.

Figure 6:
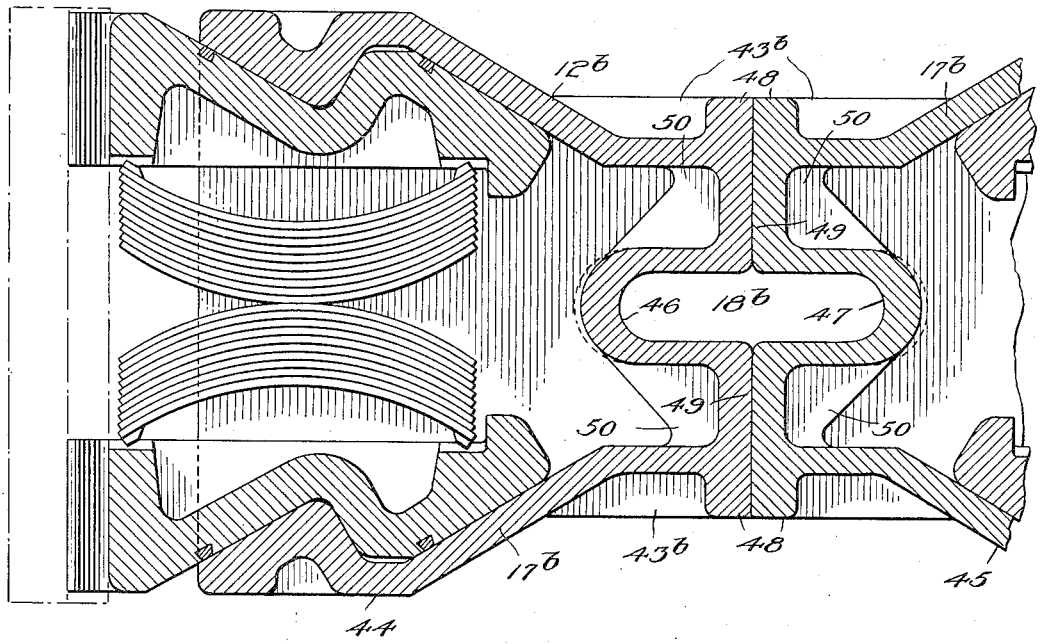
Figures 6 and 7 are views corresponding respectively to Figures 3 and 4 but showing a modification.

On account of the present day weight of and speed at which railway equipment is moved, the limits within which the accompanying energy can be absorbed have passed beyond the conventional two and one-half inches and two and three-fourths inches regardless of the capacity of a draft gear having such limits of movement. It will be understood that in a draft gear for absorbing large amounts of energy, it is desirable that the capacity thereof be greater on buff than under the action of draft forces, because it is under buff that the larger amount of energy is necessarily absorbed. It is also desirable for the same reason that the distance the coupler and associated draft gear parts move in absorbing energy be greater under the action of buffing forces than under the action of draft forces, whereby the slack to be taken up in starting a train is maintained relatively low, while at the same time provision is made for absorbing the requisite energy without exerting too great a resisting force, thereby obviating damage to the rolling stock.

The conventional gear travel of the present time is ample under pull, but a draft gear of high enough capacity to seem to absorb the normal buffing shock is too high in capacity to handle pulling shocks without unduly stressing the coupler and attachments. The desirable characteristics of a draft gear are found to be moderate travel and capacity under pull and at least twice the travel and capacity for energy absorption under buff. This result has been accomplished by using two draft gears with a yoke surrounding the outermost or front gear so that it works only under pull, while both gears are closed under compression. Without changing the standard car overhang, it is impossible to accommodate a standard gear at the rear of the yoke.

In accordance with my invention I accomplish the desired result heretofore obtained, by using, instead of two gears, a single draft gear comprising a shell or housing preferably open at both ends and slotted adjacent the central portion thereof for receiving a key adapted to connect said shell with the associated draft or center sills, said shell receiving friction elements in both ends, the elements at one end only being operated on draft and the elements in both ends being operated on buff.

Referring now to the drawings in detail, like parts being designated by like reference characters, and first considering the embodiment of my invention illustrated in Figures 1 to 5 inclusive, there are shown in Figures 1 and 2 portions of an underframe adapted for use in connection with railway rolling stock and comprising center or draft sills 1 connected by a backstop or combined backstop and center filler casting 2 and a striking casting or combined striking casting and sill tie member 3. In the present embodiment the combined casting 3 is shown provided with a device 4 for centering the associated coupler 5, but it will be understood that I am not limited to such showing.

The sills 1 are slotted for receiving draft keys for connection with associated draft rigging and preferably have connected thereto cheek plates 6 which are correspondingly slotted with the slotted portions therein reinforced by flanges 7 for rigidifying the edges of said members adjacent said slots for the proper transmission of large forces. In the present instance I employ cheek plates 6 which are each provided with three slots designated 8, 9 and 10 respectively. Although I have shown the front slots 8 as being completed by the rearwardly extending flanges or webs 11 of the striking casting 3, it will be understood that, if desired, cheek plates 6 may be formed with three complete slots. The construction is preferably as illustrated so as not only to provide for the more secure connection of the striking casting 3 to the sills 1 but also to minimize the necessary weight of the cheek plates 6. As illustrated, the striking casting 3 and the cheek plates 6 are preferably riveted to the sills 1.

Mounted between the sills 1 is a slotted, double ended, series friction draft gear 12 preferably supported on carry irons 13 and 14 which are connected to the sills 1 in any desired manner as by means of bolts 15 and nuts 16. Said gear desirably comprises a column member, housing or shell 17 open at each end and slotted adjacent its central portion, as indicated at 18, for receiving a horizontal key 19 serving for connecting said housing to the cheek plates 6 and associated sills 1 as by passing through the rearmost slots 10 in said cheek plates. Said slots 10 are positioned and of such a length as compared with the width of the key 19 that said key when in place holds the housing 17 stationary when draft forces are applied to the gear 12, but permits said housing 17 to move rearwardly under the action of buffing forces.

Each end of the housing or shell 17 is formed double bell mouthed, that is, it is provided with sloping walls 20 providing outermost flaring or inclined friction surfaces 21 and inwardly disposed but preferably correspondingly inclined or inwardly converging walls providing friction surfaces 22 with a shouldered portion 23 therebetween. Cooperating with the friction surfaces and shouldered portions on the shell or housing 17 are both front and rear friction shoes or wedges 24 provided with correspondingly inclined friction surfaces 25 and 26 engaging the friction surfaces 21 and 22 on the shell and provided with a shouldered portion 27 therebetween for cooperating with the correspondingly shouldered portion 23 on the housing and limiting outward movement of said friction elements 24 with respect to the housing when assembled therewith.

In order to urge the friction elements 24 into engagement with the friction surfaces on the housing 17, resilient means 28, preferably in the form of curved leaf springs, are provided between the friction elements at each end of the housing. Said leaf springs at each end preferably involve two sets of plate or leaf springs bowed or curved concavely toward the adjacent friction elements 24. In order to prevent shifting of the spring leaves with respect to one another and with respect to the friction elements 24, said leaves are desirably formed with embossments providing nibs or projections 29 received in corresponding depressions or notches 30 in the friction elements 24. It will be understood that the projections provided on the spring leaves other than the outermost are received in nested relation in the corresponding depressions or notches formed by embossing the spring leaves to provide the nibs or projections 29 so that all of said leaves are retained in proper relation with respect to each other and the friction elements 24. In order to insure smooth action between the friction surfaces 25 and 26 on the friction elements and the engaging surfaces 21 and 22 on the shell, some of said surfaces are desirably formed with inserts 31' of lead or other substance.

The draft gear 12 is connected to the butt or draw bar 31 of the coupler 5 in a usual manner as by means of a horizontal yoke 32 embracing said gear with its ends extending forwardly on each side thereof and connected to the butt 31 of the coupler by a horizontal draft key 33 extending through registering slots in the coupler butt and yoke, and with its ends received in the front slots 8 in the cheek plates 6. It will be apparent that the slots 8 in said cheek plates are of such a length that the key 33 is permitted to move distances in both directions sufficient to stress the associated gear 12 to the desired extent. Although I have illustrated conventionally the draw bar or butt 31 of the coupler as being of the type described and claimed in my Patent No. 1,431,717, dated October 10, 1922, it will be understood that I do not wish to be limited to the use of my gear with such a type of coupler which provides for swiveling or horizontal angling of the head, as my gear is adapted for use with couplers of any desired character.

Disposed between the butt 31 of the coupler 5 and the front friction elements 24 is a front follower 34 designed to transmit buffing forces between the butt of the coupler and the friction elements 24 to effect compression of the gear 12. In order to hold said front follower in proper relation with respect to the yoke 32, shoulders or extensions 35 are desirably provided engaging the upper edge of the yoke, as illustrated particularly in Figures 1 and 4. In order to retain the follower 34 in proper relation with respect to the friction elements 24, projections 36 are desirably provided on the friction elements 24 received in corresponding pockets 37 in the follower for interlocking the parts together while permitting vertical sliding motion therebetween. On account of this construction, the follower will always remain in engagement with the ends of the friction elements 24 even when the coupler butt 31 pulls from the front follower 34 under the action of draft forces. A similar construction is desirably effected between the rear follower 38 disposed between the rear end of the yoke 31 and the rear ends of the rear friction elements 24. In other words, the follower 38 may be identical with the follower 34 for convenience and economy of manufacture and be correspondingly interlocked with the friction elements 24.

The friction shell or housing inwardly or intermediate the sloping walls 20 forming the bell mouth portions is desirably constructed by connecting the innermost ends of the inwardly converging walls providing sloping walls by longitudinal webs 39 extending between the longitudinally extending, preferably substantially parallel, side walls 40. Said side walls are apertured to provide for the slot 18 through the housing, as previously described, and are desirably reinforced around said slot by beading 41. Between the side walls 40, the construction is rigidified by providing inclined walls connecting the innermost surfaces of said side walls and joining adjacent the ends of the slot 18 to provide continuations 42 of the ends of the slotted portions of the housing from one side wall to the other, as indicated. Exteriorly of the web portions 39, the housing is desirably reinforced by the spaced longitudinal webs or ribs 43, extending from the outer surfaces of the side or, in the position illustrated, the upper and lower walls which have the inwardly converging portions. By forming the housing generally corset shaped, as described, rather than with parallel upper and lower walls, not only is a saving in material effected, but a sturdier construction is provided. This improvement may be due to the fact that the inclined or converging walls act as buttresses resisting the tendency of the center section to distort under the influence of forces acting thereon.

From the foregoing description, it will be seen that under the action of draft forces the housing 12 is held stationary by the key 19 and the coupler 5 pulls the yoke 32 forwardly, through the connecting key 33, moving the rear follower 38 and pushing the associated friction elements 24 into the rear opening in the shell or housing 12 against the resistance of the springs 28, thereby actuating only the rear cushioning mechanism, whereby the cushioning effect on draft is only one-half of the total capacity of the double ended gear, and the travel of the coupler on draft with respect to the draft sills is only one-half of the total permissible compression of the gear.

Under the action of buffing forces, however, the butt 31 of the coupler engages the front follower 34 pushing the front friction elements 24 into the front opening in the housing 12 and simultaneously moving said housing rearwardly over the rear friction elements 24, so that a full compression of the gear on buff is permitted, thereby providing for not only increased buffing capacity, but for coupler travel equal to the sum of the travel permitted by the friction elements at each end of the gear. Although for convenience and economy in manufacture, the gear is preferably made symmetrical so that the travel and capacity provided by each end thereof is identical, yet this is not essential in accordance with the broad aspect of my invention, so that the capacities and travels of the two ends of the gear may be either equal or different, as desired.

In accordance with the foregoing description, it will be seen that the intermediate slots 9 in the sills or plates were not used with my double ended draft gear and may, therefore, be omitted if such sills or plates are to be used exclusively with such a gear. In Figure 2 I have illustrated how said cheek plates may be used interchangeably with my draft gear and an ordinary type of single ended gear 12ª. As in Figure 1, I show a coupler 5 of the same type so as to provide for radial motion or swiveling thereof, although as before explained, this is not essential. Said coupler is connected to the yoke 32ª by means of the horizontal key 33 as in Figure 1. It will be seen, however, that the yoke 32ª is slightly shorter than the yoke 32 of Figure 1 because the permissible travel on buff of the gear 12ª is less than that of the gear 12, so that the horn of the coupler is normally closer to the striking casting with the arrangement shown in Figure 2 than with that shown in Figure 1. Disposed between the gear 12a and the butt 31 of the coupler is a front follower 34a of conventional form and supported between the sills 1 by the key 19a, said key, however, being received in the intermediate slots 9 in the cheek plates 6 rather than in the rearmost slots 10 thereof.

It will be apparent that the draft rigging illustrated in Figure 2 is of the conventional horizontal yoke or Farlow type except that the cheek plates are rearwardly extended and each has an extra slot therein which is not used at one and the same time with the second slot. Under the action of draft forces the gear 12a, which is merely conventionally illustrated, is actuated by the yoke 32a from the coupler 5 through the connecting key 33, and is compressed by having the front end held stationary against the front follower 34a held in place between the sills by the key 19a, so that said key 19a functions in a similar manner to the key 19 of Figure 1 except that it is positioned in the intermediate rather than the rearmost slots in the cheek plates. Under the action of buffing forces, the butt 31 of the coupler engages the front follower 34a moving it rearwardly to compress the gear 12a against the rear follower 36a, yoke 32a and backstop 2. It will therefore be apparent that with the gear shown in Figure 1 the travel on buff is greater or twice that of the travel on draft, whereas with the gear shown in Figure 2, the travel on buff is equal to the travel on draft, and a similar comparison may be made of the capacities provided under buff and draft.

In order to clearly show how the sills or plates 6 are constructed so as to be adapted for use with either my double ended series draft gear or a conventional single ended gear or one acting the same on buff and draft, I will give a concrete example which should be understood, however, as being for the purpose of illustration only and not as limiting. Assume that my double ended series draft gear illustrated has a permissible travel of the mechanism at each end of two inches. The rigging illustrated in Figure 1 will therefore permit a pulling action of two inches forward from normal position and a buffing action of four inches rearward from normal position. Under such circumstances the horn of the coupler is desirably normally positioned approximately 4¼ inches forward of the striking face of the combined casting 3. Let it be assumed that the gear 12a in Figure 2 provides for a travel of 2½ inches. Then the horn of the coupler in Figure 2 is normally positioned preferably about three inches forward of the striking face of the combined casting 3. In other words, with the arrangement in Figure 1, the horn of the coupler in normal position is disposed forwardly of the striking face of the combined casting a distance greater than when used with a conventional draft gear having the same travel on buff and draft, the increase in the normal distance from the striking face of the casting corresponding approximately to the increase in buffing motion permitted by my double ended series draft gear.

In order, therefore, to design the cheek plates 6 so that they are adapted for use with either type of gear, the front slots 8 must be constructed so that they provide for the desired amount of travel of the draft key 33 when used with either rigging. The slots 8 in accordance with the showing in Figure 1 should therefore permit a rearward movement of the draw bar 31 of at least four inches to provide for the full closing of the gear 12. Inasmuch as some clearance is provided for the key 33 in the draw bar 31, it is sufficient if four inches clearance is provided between the rear edge of the key 33 and the rear end of the slots 8 when said key is in normal position, as shown in Figure 1.

Referring now to Figure 2, it will be seen that the normal position of the coupler is disposed 1¼ inches rearward of the normal position of the coupler in Figure 1, so that the normal position of the key 33 is 1¼ inches closer to the rear ends of the slots 8 allowing a clearance of 2¾ inches instead of four inches, which clearance is sufficient to provide for the full closing of the gear 12a. From this it will be seen that in accordance with the present example, the rear ends of the slots 8 in the cheek plates 6 may be almost normal in position, that is, they may be disposed approximately ¼ inch rearward from normal to allow for the 1½ inches extra rearward travel of the coupler, said coupler starting from a position 1¼ inches forward of normal as compared to a conventional gear of 2½ inches travel.

The position of the front ends of the slots 8 is determined in a similar manner, that is, the slots 8 must extend forwardly a sufficient distance from the normal position of the key 33, as shown in Figure 1, to permit a two inch travel of the coupler 5 and gear 12 and, allowing a ½ inch clearance, the front ends of said slots may desirably be positioned 2½ inches forward of the normal position of the key 33. Inasmuch as said key is normally disposed 1¼ inches forward of normal in Figure 2, they would allow 3¾ inches forward clearance for the key with the arrangement shown in Figure 2, which would, therefore, provide for ample motion of said key for compressing the gear 12a with 2½ inches travel. It will therefore be seen that the cheek plates 6 and associated combined striking casting 3, if used therewith to complete the front slots therein, are so designed to provide front slots 8, which extend rearwardly from normal a small distance, such as ¼ inch in the illustration given, and forwardly from normal a relatively greater distance, say about one inch in the illustration given, to allow for the extra travel provided by the gear 12 and the normal forward positioning of the coupler as compared with the conventional form of gear which provides for the same amount of travel on both buff and draft.

Inasmuch as the second or intermediate slots 9 are not used with the double ended draft gear 12, their position and length may be normal or correspond entirely with the gear 12a. The position and size of the rear slots 10 is likewise governed entirely by the construction of the gear 12 and particularly the housing or shell 17 thereof. If the slot 18 in the housing 17 is disposed midway of the ends of said housing, then the normal position of the center line of the key 19 will be midway between the normal position of the rear face of the coupler butt or draw bar 31 and the rear face of the rear follower 38 when normally disposed as in the embodiment illustrated in Figure 1, where the gear is shown having similar cushioning mechanism in each end of the shell 17. The slots 10 in the embodiment illustrated, therefore, extend from a point forward from this mid point a distance equal to half the width of the key 19 to a point rearward thereof a distance equal to half the width of said key plus two inches in the present instance or a distance corresponding to the travel permitted by the cushioning mechanism in the front end of the housing or shell 17. From the foregoing concrete illustration, it will be clear how to calculate the positions of slots in the triple slotted cheek plates of my invention.

Figure 7:
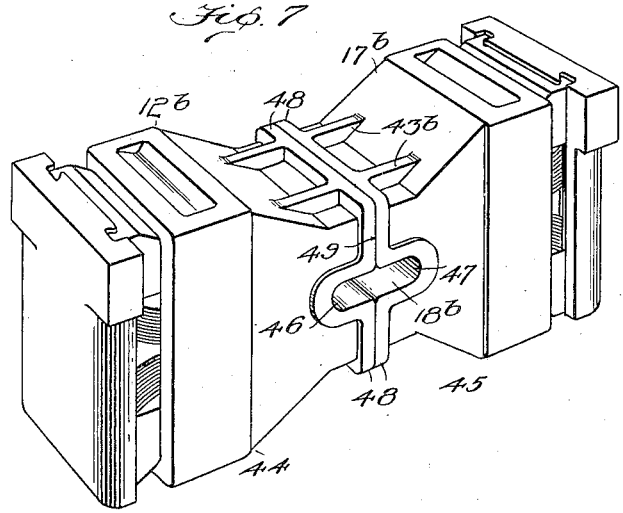

Referring now to the embodiment of my invention illustrated in Figures 6 and 7, a gear 12<sup>b</sup> is illustrated which is identical with the gear 12 of Figures 1, 3, 4 and 5 except that the housing or shell 17<sup>b</sup> is formed in two parts 44 and 45, each part being notched, as indicated at 46 and 47, so that when in abutting engagement, as illustrated, the notches 46 and 47 form the slot 18<sup>b</sup> adapted to receive an associated key such as the key 19 of Figure 1. As in the embodiment illustrated in Figures 3 and 4, the parts of the housing may be reinforced by external webs or flanges 43<sup>b</sup> which, however, are preferably not as deep as the flanges 43 and terminate at and merge into outstanding flanges or beading 48 at the innermost ends of the shell portions 44 and 45 where the same abut one another for increasing the bearing area for the transmission of buffing forces therebetween. As in the first embodiment, the slotted portion is preferably formed continuous from side wall to side wall and in the present instance said continuity not only applies to the ends of the slotted portions, but is continued to the open ends of the notches 46 and 47, as illustrated particularly in Figures 6 and 7, so that the abutting walls 49 of the housing portions 44 and 45 are connected by the notched portions 46 and 47 which arch away from and back to said wall portions. Said notched portions are desirably rigidified by longitudinally extending ribbing or webbing 50. Except as specifically described in connection with the embodiment shown in Figures 6 and 7, the gear may be identical with that of Figures 1, 3, 4 and 5.

From the foregoing description taken in connection with the accompanying drawings, it will be apparent that I have devised a form of draft rigging using multiple or triple slotted cheek plates which are adapted for use with either a novel form of double ended gear or with a conventional form of gear and associated Farlow rigging. It will also be seen that I have devised an improved form of series draft gear enclosed in housing means as a unitary cushioning device, although, if desired, said housing means may be formed in two sections.

In the preferred form of my invention illustrated I have shown slotted cheek plates attached to the draft sills or vehicle framing, but it will be obvious that such plates may be omitted, if desired, and the sills or walls of the draft gear pocket correspondingly slotted.

Although the sections of the housing are illustrated as being similar, it will be understood that I do not wish to be limited to this showing as, if desired, the housing may be divided in some other place than at the exact center thereof.

Because of the fact that the rear friction elements are actuated under both draft and buffing forces, while the forward friction elements are actuated only by buffing forces, said rear friction elements will have a tendency to wear faster than the front friction elements. By making the gear symmetrical, as in the preferred embodiment, it will be understood that after a material amount of wear has occurred, said gear may be reversed, so that the end originally at the front is at the back, whereby the end subjected to double wear will then be subjected only to wear upon buffing movement of the drawbar, so that the wear on the parts may be equalized and the useful life of the gear increased.

I have illustrated certain preferred embodiments of my invention, but it will be understood that I do not wish to be limited thereto as modifications may be made within the spirit and scope of the appended claims without departing from my invention.

Having now described my invention, I claim:

1. Cushioning mechanism comprising a housing open at both ends, a set of friction elements cooperating with said housing at each end, resilient means disposed between said friction elements for urging them apart and into engagement with said housing, said housing being slotted for receiving a connecting key.

2. Cushioning mechanism comprising a housing slotted adjacent the center thereof for receiving a connecting draft key, the ends of said housing flaring outwardly to provide inclined friction surfaces, friction elements received in each end of said housing and presenting correspondingly inclined friction surfaces for engagement with the friction surfaces on the housing, and resilient means disposed between said elements for urging them into engagement with the friction surfaces on the housing.

3. Cushioning mechanism comprising housing means open and provided with inclined friction surfaces at front and rear ends, a set of friction elements with correspondingly inclined cooperating friction surfaces disposed in said housing means at each end, resilient means at each end of the mechanism disposed between the friction elements for urging them into engagement with said housing means, and followers engaging the outer ends of said friction elements, said housing being slotted for receiving a key adapted to connect it with associated draft sills.

4. Cushioning mechanism comprising a housing open and provided with inclined friction surfaces, friction wedges with correspondingly inclined friction surfaces cooperating with the inclined friction surfaces on said housing, resilient means disposed between said wedges for urging them into frictional engagement with said housing, a follower engaging the outer ends of said wedges, and projections extending between said follower and wedges to directly hold the same in interlocked relation, and against relative longitudinal movement, while permitting movement of said wedges toward and away from each other upon compression and release of the mechanism while maintaining said interlocking relation.

5. Cushioning mechanism comprising a housing having an open end provided with inclined friction surfaces, a set of friction wedges received in said housing and provided with cooperating correspondingly inclined friction surfaces, resilient means disposed between said wedges for urging them into engagement with said housing, and a follower engaging the outer ends of said friction wedges, projections being provided extending between said follower and wedges to directly hold the same in interlocking relation, against relative longitudinal movement, while permitting movement of the wedges transversely of the longitudinal axis of the mechanism to effect compression of the mechanism while maintaining said interlocking relation.

6. A housing for cushioning mechanism comprising two pairs of side walls, the members of one pair being substantially parallel, those of the other being inwardly converging toward a central portion of the housing, and outstanding flanges filling the spaces in the exterior angles between the converging portions and spaced from one another and inwardly of the planes of the substantially parallel walls.

7. A housing for cushioning mechanism comprising two pairs of side walls, the members of one pair being substantially parallel, and those of the other having parts converging inwardly toward a central part of said housing, the inwardly converging and central parts of said walls being rigidified by pairs of spaced longitudinal ribs extending from the outer surfaces thereof and spaced inwardly from the planes of the substantially parallel walls.

8. In railway draft rigging, in combination with slotted draft sills, a draw bar and yoke-acting means, a friction draft gear comprising a housing open at both ends, friction elements cooperating with said housing at each end, resilient means at each end disposed between said friction elements for urging them apart and into engagement with said housing, said yoke-acting means embracing said housing and friction elements for actuating the rear elements on draft, said housing being slotted between the friction elements at the ends thereof, and a key received in said slotted portion of said housing and the slots in said sills, said sill slots being elongated rearwardly only to permit rearward movement of the housing on buff while holding it stationary on draft, whereby the friction elements at both ends of the housing are operated on buff while only those at the rear end are operated on draft.

9. In railway draft rigging, in combination with draft sills, a drawbar and yoke-acting means, a friction draft gear comprising slotted housing means with a set of friction elements cooperating therewith at each end, resilient means disposed between said friction elements for urging them apart and into engagement with said housing means, said yoke-acting means embracing said housing means for actuating the rear cushioning mechanism on draft, and a key disposed between the friction elements at the ends of the gear and passing through the slotted portion of said housing means for connecting the same to said sills so as to hold said housing means stationary under the action of draft forces, the connection of the key to the sills permitting rearward movement only of the housing means under the action of buffing forces so as to actuate the friction elements and resilient means at each end of the housing means under buff while preventing the actuation of said friction elements and resilient means at the front end under the action of draft forces.

10. In railway draft rigging, in combination with slotted draft sills, a drawbar and yoke-acting means, a friction draft gear embraced by said yoke-acting means and comprising a column member, a set of friction elements cooperating with said member at each end, resilient means acting laterally on said friction elements for urging them into engagement with said column member, said column member being provided with a slot between the friction elements at the ends, and a key received in said slot and corresponding slotted portions in said sills, said slotted portions being elongated rearwardly only from the normal position of the key in order to hold the column member stationary on draft, with the front friction elements inactive, while allowing rearward movement thereof on buff.

11. In railway draft rigging, in combination with draft sills, a drawbar and yoke-acting means, a friction draft gear comprising a column member, friction elements cooperating with said member at each end, resilient means acting laterally on said friction elements at each end for urging them into engagement with said column member, said yoke-acting means embracing said member and friction elements, and a key disposed between the friction elements and resilient means at the ends of said column member and received in a slot in the latter and registering slots in said sills, said sill slots being engaged by the front edge of said key when the latter is in normal position and elongated rearwardly from the rear edge of said key to permit the column member to move when the drawbar is subjected to buffing forces, while holding it stationary on draft, whereby all the friction elements are operative under buff and those at the rear end only on draft.

12. In railway draft rigging, in combination with draft sills, cushioning mechanism comprising a column member with inclined friction surfaces, a set of friction elements with correspondingly inclined surfaces cooperating with said column member at each end, resilient means disposed at the sides of said friction elements for urging them into engagement with the inclined friction surfaces on said column member, and means, disposed midway of the ends of the column member, intersecting and connecting said column member and sills.

13. In railway draft rigging, in combination with draft sills, a drawbar, a friction draft gear comprising relatively movable longitudinally spaced sets of friction elements, both of said sets being operated to produce friction in buffing and one of said sets being frictionally inoperative on draft, friction casing means having portions frictionally cooperating with the respective sets of friction elements, resilient means acting laterally on said friction elements for urging them into engagement with said casing means, yoke-acting means embracing said casing means and said sets of friction elements and resilient means and adapted on draft to cause relative movement between one set of friction elements and the portion of said casing means which frictionally cooperates therewith, means for operatively connecting the drawbar and yoke-acting means, and means for limiting movement of the casing with respect to the sills, said latter means extending between said sets of friction elements transversely of said casing means for preventing, during draft, while permitting during buff, relative movement between one set of friction elements and the portion of said casing means frictionally cooperating therewith.

14. In railway draft rigging, in combination with draft sills, a drawbar, yoke-acting means, cheek plates respectively secured to said draft sills and each provided with a plurality of longitudinally spaced key slots, a key for connecting said drawbar and yoke-acting means, said key being received in the forward slots of said cheek plates, a friction draft gear comprising housing means, a plurality of sets of friction elements spaced longitudinally and frictionally cooperating with said housing means, resilient means disposed between said friction elements for urging them apart and into engagement with said housing means, and a key extending between said sets of friction elements and received in the rear slots of said cheek plates, said yoke-acting means embracing said housing means and said sets of friction elements and resilient means and adapted to cause one set of friction elements to be actuated with respect to said housing means on draft, the forward key slot in each cheek plate being adapted to permit the key therein to move from normal position a greater distance on buffing than on draft, and the rear slot in each cheek plate being of a length to permit the key therein to move rearwardly from its normal position on buffing but prevent forward movement thereof from normal position.

15. In railway draft rigging, in combination with draft sills, a drawbar, yoke-acting means, cheek plates respectively secured to said draft sills and each provided with a plurality of longitudinally spaced key slots, the slots in one plate registering with those in the other, means received in the forward slots of said cheek plates for connecting said drawbar and yoke-acting means, a friction draft gear comprising housing means open at front and rear ends, a set of friction elements cooperating with said housing means at each end, resilient means disposed between said friction elements for urging them apart and into engagement with said housing means, a key extending through said housing means and received in the rear slots of said cheek plates, said yoke-acting means embracing said housing means and the associated friction elements to cause the rear set of friction elements to be actuated with respect to said housing means when the drawbar is subjected to draft forces, the forward key slots in the cheek plates being elongated to permit the connecting means to move from normal position a greater distance on buffing than on draft, and the rear slots being of a length adapted to permit the key therein to move rearwardly from its normal position on buffing, while preventing forward movement thereof from normal position.

16. In railway draft rigging, in combination with a drawbar, cheek plates each provided with a plurality of longitudinally spaced key slots, a pair of cushioning devices disposed between said cheek plates, each device comprising main friction means, a set of friction elements cooperating with said main friction means, and resilient means acting laterally on said friction elements for urging them into engagement with said main friction means, yoke-acting means provided with key slots, a key extending through said yoke-acting means slots, through the forward slots of said cheek plates, and serving to operatively connect the drawbar and yoke-acting means, and another key extending through other slots in said yoke-acting means and between said cushioning devices, entering the rearward slots of said cheek plates, and serving to stop the main friction means of the rear cushioning device and prevent it from actuating the front cushioning device on draft, said cheek plates cooperating with said last-named key to prevent forward movement thereof when the coupler is subjected to draft forces, while permitting it to move rearwardly on buff.

17. In railway draft rigging, in combination with draft sills, a drawbar, a pair of cushioning devices disposed between said sills, each device comprising main friction means, a set of friction elements cooperating therewith, and resilient means acting laterally on said friction elements for urging them into engagement with said main friction means, yoke-acting means extending rearwardly around said cushioning devices, means for operatively connecting the drawbar and yoke-acting means, and a key extending between said cushioning devices, said draft sills and yoke-acting means being slotted to receive said key, said slots being adapted to permit said key to move rearwardly on buff, while preventing forward movement thereof and actuation of one of said cushioning devices by the other on draft.

18. In railway draft rigging, in combination with railway vehicle framing, a drawbar, a pair of cushioning devices, each device comprising main friction means, a set of friction elements cooperating therewith, and resilient means acting laterally on said friction elements to urge them into engagement with said main friction means, yoke-acting means extending rearwardly around said cushioning devices, means for operatively connecting the drawbar and yoke-acting means, a key extending between said cushioning devices, said framing and yoke-acting means being slotted to receive the end portions of said key, said key being movable rearwardly on buffing, and means rigidly secured to the framing for preventing forward movement of said key and actuation of the front device by the rear cushioning device on draft.

19. In railway draft rigging, in combination with railway vehicle framing, a drawbar, a pair of cushioning devices, each device comprising main friction means, a set of friction elements cooperating with said means and resilient means acting laterally on said friction elements to urge them into engagement with said main friction means, yoke-acting means provided with key slots, a key extending through said slots in the yoke-acting means and serving to operatively connect the drawbar to said means, another key extending between said cushioning devices and through slots in the yoke-acting means, and means rigidly secured to the framing for preventing forward movement of said last-mentioned key on draft to cause it to function as front stop means for the rear cushioning device and prevent actuation of the front cushioning device thereby, said keys being movable with respect to one another on draft and on buffing.

20. In railway draft rigging, in combination with draft sills, a drawbar and yoke-acting means, a friction draft gear comprising housing means open at front and rear ends, a set of friction elements cooperating with said housing means at each end, resilient means disposed between said friction elements for urging them apart and into engagement with said housing means, said yoke-acting means embracing said housing means and friction elements for actuating the rear element on draft, and a key disposed in slots in said housing means between the set of friction elements and associated resilient means at the ends of the housing means and with its ends received in slots in said sills, said sill slots being rearwardly elongated only, permitting rearward movement of the housing means on buff, while holding the same stationary on draft.

21. In combination with a railway vehicle, cheek plate means each formed with a plurality of longitudinally spaced key slots, a drawbar, a yoke and a draft gear housing, with a cushioning unit in each end, mounted between said cheek plate means, transversely extending keys received in said slots and respectively connecting said coupler and yoke and passing, between said cushioning units, through said housing, for attaching the latter to the plate means, the outermost or front slots being elongated rearwardly of the normal position of its key an amount sufficient to permit a complete closure of the draft gear, the innermost or rear slots, which receive the housing key, being elongated rearwardly of the normal position of said key to permit rearward movement of said housing while normally engaging the front edge of said key to hold the housing stationary under the action of draft forces.

22. A housing for cushioning mechanism comprising two pairs of side walls forming a structure generally rectangular in transverse sectional outline, the members of one pair being substantially parallel and those of the other having inclined portions converging inwardly toward a central part of said housing, and longitudinally extending wall-bracing ribs, forming gussets substantially filling out the housing to the generally rectangular outline, disposed in the exterior angles between said converging portions, said ribs having substantially parallel outer edges and being spaced inwardly from the outer surfaces of the other pair of walls.

23. In a cushioning mechanism, the combination of a bell-mouthed housing having spaced integral inclined wedging friction faces, of a pair of friction elements having correspondingly inclined wedging friction faces each directly engaging one pair of said faces on said housing, shoulders interrupting each pair of wedging friction faces on said elements and housing, the shoulders on said elements being adapted to engage the shoulders on the housing to interlock each element with the housing, said friction elements having end portions normally extending outwardly beyond the housing for engagement with a follower spaced longitudinally from said housing, and means for maintaining said elements in interlocked relation with said housing, said means including a plurality of sets of reversely bowed leaf springs, said sets of leaf springs contacting with each other adjacent the center and directly engaging said friction elements adjacent each end thereof, whereby the tendency of said elements to rock upon inward movement into said housing is counteracted.

24. Cushioning mechanism comprising an outer friction member formed with two pairs of side walls, the members of one pair being substantially parallel and those of the other being inclined, converging inwardly toward a central part and providing interior friction surfaces, friction elements positioned between said inclined side walls and formed with correspondingly inclined friction surfaces directly engaging said interior friction surfaces, the engaging surfaces involving offset portions so that when assembled the friction elements are interlocked with respect to the outer friction member, longitudinally extending exterior wall-bracing ribs, forming gussets filling out the outline of said housing in the angles between said converging portions, and springs positioned between and directly engaging the friction elements for urging them apart and into engagement with the outer friction member and holding said elements in assembled relation.

25. Cushioning mechanism comprising housing means open and provided with a pair of side walls having portions converging from each end, joined at their inner, more closely spaced, ends by intermediate, correspondingly spaced, substantially parallel portions and said converging portions forming interior inclined friction surfaces adjacent the front and rear ends of the housing means, a set of friction elements with correspondingly inclined cooperating friction surfaces disposed in said housing means at each end, resilient means in each end of the housing means and disposed between the friction elements for urging them into engagement with said housing means, and follower means normally engaging the outer ends of said friction elements.

26. Cushioning mechanism comprising a housing open and provided with a pair of side walls, having portions bodily offset but parallel to each other, converging from each end, and with the inner ends of the inner offset portions joined by substantially parallel portions and forming a plurality of offset inclined friction surfaces at each end, in which a set of friction surfaces at each end of said housing is spaced inwardly from another set of friction surfaces and separated therefrom by portions of the housing providing shoulders, the inner ends of the inner converging side wall portions being joined by substantially parallel wall portions, laterally offset from the normal outline of the housing to correspond with the lateral spacing of the adjacent ends of said converging portions, a set of friction elements with correspondingly inclined cooperating friction surfaces, separated by corresponding shoulders, disposed in said housing at each end, said housing and friction element shoulders normally engaging to limit outward movement of said friction elements, the inwardly disposed engaging friction surfaces forming, in effect, extensions of the first-mentioned friction surfaces for increasing the contacting frictional area of the mechanism, and resilient means at each end of the mechanism disposed between the friction elements for urging them into engagement with said housing.

27. Cushioning mechanism comprising an outer friction member with normally upright side wall portions formed with receptacles to accommodate a connecting draft key, said member having another pair of walls comprising portions converging inwardly from both ends toward a central part and providing interior inclined friction surfaces, friction elements positioned between the converging portions of said walls and formed with correspondingly inclined friction surfaces directly engaging said interior inclined friction surfaces, and springs acting on said friction elements for urging them into engagement with the outer friction member.

DONALD S. BARROWS.